(12) United States Patent
Lee et al.

(10) Patent No.: US 11,012,321 B2
(45) Date of Patent: May 18, 2021

(54) PROVIDING SERVICE ACCORDING TO USER AUTHORITY

(71) Applicant: Hewlett-Packard Development Company, L.P., Spring, TX (US)

(72) Inventors: Jee Hee Lee, Suwon-si (KR); Hyun Sub Kil, Suwon-si (KR); Jae In Lee, Suwon-si (KR); Se Rrah Lim, Suwon-si (KR); Hye Heon Jung, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/480,826

(22) PCT Filed: Feb. 1, 2018

(86) PCT No.: PCT/KR2018/001368
§ 371 (c)(1),
(2) Date: Jul. 25, 2019

(87) PCT Pub. No.: WO2018/143683
PCT Pub. Date: Aug. 9, 2018

(65) Prior Publication Data
US 2019/0394099 A1    Dec. 26, 2019

(30) Foreign Application Priority Data

Feb. 2, 2017 (KR) .................... 10-2017-0014979

(51) Int. Cl.
*G06F 15/173*    (2006.01)
*H04L 12/24*    (2006.01)
(Continued)

(52) U.S. Cl.
CPC ....... *H04L 41/5009* (2013.01); *G06Q 10/101* (2013.01); *H04L 41/5041* (2013.01);
(Continued)

(58) Field of Classification Search
CPC ............. H04L 41/5009; H04L 41/5041; H04L 63/102; H04L 67/16; H04L 67/42; G06Q 10/101
(Continued)

(56) References Cited

U.S. PATENT DOCUMENTS 5,677,851 A * 10/1997 Kingdon ............... G06F 21/604
709/225
8,812,429 B2 * 8/2014 Forsee, II ............. H04M 3/493
706/52

(Continued)

FOREIGN PATENT DOCUMENTS

WO    WO-0011583 A2    3/2000
WO    WO 2016-055645 A1    4/2016

*Primary Examiner* — Alicia Baturay
(74) *Attorney, Agent, or Firm* — Jefferson IP Law, LLP (57) ABSTRACT

A server may determine, with respect to a user who has accessed the server, a user level within a hierarchy structure and a user group to which the user belongs. The server may determine, according to an authority that is set by a manager at a level higher than that of the user within the user group with respect to the user level of the user, a service level of a service that is to be provided to the user. The server may provide the service to the user according to the service level.

15 Claims, 8 Drawing Sheets

(51) Int. Cl.
*G06Q 10/10* (2012.01)
*H04L 29/06* (2006.01)
*H04L 29/08* (2006.01)

(52) U.S. Cl.
CPC ............ *H04L 63/102* (2013.01); *H04L 67/16* (2013.01); *H04L 67/42* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 9,250,955 | B1* | 2/2016 | Cox | G06F 9/4843 |
| 9,519,425 | B1* | 12/2016 | Wood | G06F 3/067 |
| 9,826,042 | B2* | 11/2017 | Lotlikar | H04L 67/146 |
| 9,916,369 | B2* | 3/2018 | Pearson | G06F 16/258 |
| 10,075,825 | B2* | 9/2018 | Egan | H04W 4/21 |
| 10,158,923 | B2* | 12/2018 | Delmas | H04L 67/1068 |
| 10,275,837 | B2* | 4/2019 | Jeffers | G06Q 50/01 |
| 10,521,482 | B2* | 12/2019 | Zhang | G06F 16/9535 |
| 10,523,736 | B2* | 12/2019 | Wang | H04L 67/306 |
| 2002/0104018 | A1 | 8/2002 | Singhani et al. | |
| 2003/0236977 | A1* | 12/2003 | Levas | H04L 63/0892 |
| | | | | 713/158 |
| 2006/0074727 | A1* | 4/2006 | Briere | G06Q 30/0204 |
| | | | | 705/7.12 |
| 2009/0271417 | A1* | 10/2009 | Toebes | G06F 16/9537 |
| 2012/0054055 | A1* | 3/2012 | Vidovic | G06Q 30/0601 |
| | | | | 705/26.1 |
| 2013/0097182 | A1* | 4/2013 | He | G06F 16/355 |
| | | | | 707/748 |
| 2013/0110795 | A1 | 5/2013 | Derose et al. | |
| 2013/0239180 | A1 | 9/2013 | Weller et al. | |
| 2013/0297362 | A1 | 11/2013 | Yagi | |
| 2014/0337246 | A1* | 11/2014 | Williams | G06Q 10/083 |
| | | | | 705/336 |

\* cited by examiner

APPS LIST CONFIGURATION  
You can change the location to position the apps.

[ RESET ]   [ SAVE ]

*Click on app, drag it and drop to move the app.

HQ    RECOMMENDED (0)                              [ ADD ]

| Please add app via 'ADD' button. | — 520 |

ALL (48)

| APP ICON | APP ICON | APP ICON | APP ICON | APP ICON |
|---|---|---|---|---|
| App name Paid | App name Paid | App name Paid | App name Paid | App name Paid |
| APP ICON | APP ICON | APP ICON | APP ICON | APP ICON |
| App name Paid | App name Paid | App name Paid | App name Paid | App name Paid |
| APP ICON | APP ICON | APP ICON | APP ICON | APP ICON |
| App name Paid | App name Paid | App name Paid | App name Paid | App name Paid |
| APP | APP | APP | APP | APP |

| CREATE NEW SHELF | | CANCEL | SAVE |

SHELF NAME *   *Required Fields

APPS | PARTNER GROUP | PARTNER LIST

APPS

DEALER RECOMMENDED (0)   [ADD]

Please add app via 'ADD' button. — 620

HQ   RECOMMENDED (8)   [ADD]

APP ICON / App name / Paid
APP ICON / App name / Paid
APP ICON / App name / Paid
APP ICON / App name / Paid
APP ICON / App name / Paid
APP ICON / App name / Paid
APP ICON / App name / Paid
APP ICON / App name / Paid
— 610

PROVIDING SERVICE ACCORDING TO USER AUTHORITY

BACKGROUND ART

Recently, with developments in electronic communications technologies and network technologies, various services utilizing these technologies have been developed and released on the market. In particular, regarding image forming apparatuses such as printers, various services related to products sold over networks may be provided beyond simple product sales. For example, services from maintenance and repair of an image forming apparatus to providing of a cloud service through cloud environment construction are available.

DISCLOSURE OF INVENTION

Brief Description of Drawings

These and/or other aspects will become apparent and more readily appreciated from the following description of the examples, taken in conjunction with the accompanying drawings in which.

BEST MODE FOR CARRYING OUT THE INVENTION

A server may determine, with respect to a user who has accessed the server, a user level within a hierarchy structure and a user group to which the user belongs. The server may determine, according to an authority that is set by a manager at a level higher than that of the user within the user group with respect to the user level of the user, a service level of a service that is to be provided to the user. The server may provide the service to the user according to the service level.

MODE FOR THE INVENTION

Hereinafter, various examples will be described more fully with reference to the accompanying drawings. The examples that will be described hereinafter may be modified and practiced in many different forms. A description of details that are well-known to one of ordinary skill in the art will be omitted in order to more clearly describe features of the examples. Expressions such as "at least one of," when preceding a list of elements, modify the entire list of elements and do not modify the individual elements of the list.

Throughout the present application, when an element is "connected" to another element, the element may be 'directly connected thereto', or may be 'connected thereto with an intervening element therebetween'. In addition, when an element "includes" another element, it is to be understood that the element additionally includes other elements rather than excluding other elements as long as there is no particular opposing recitation.

Figure 1:
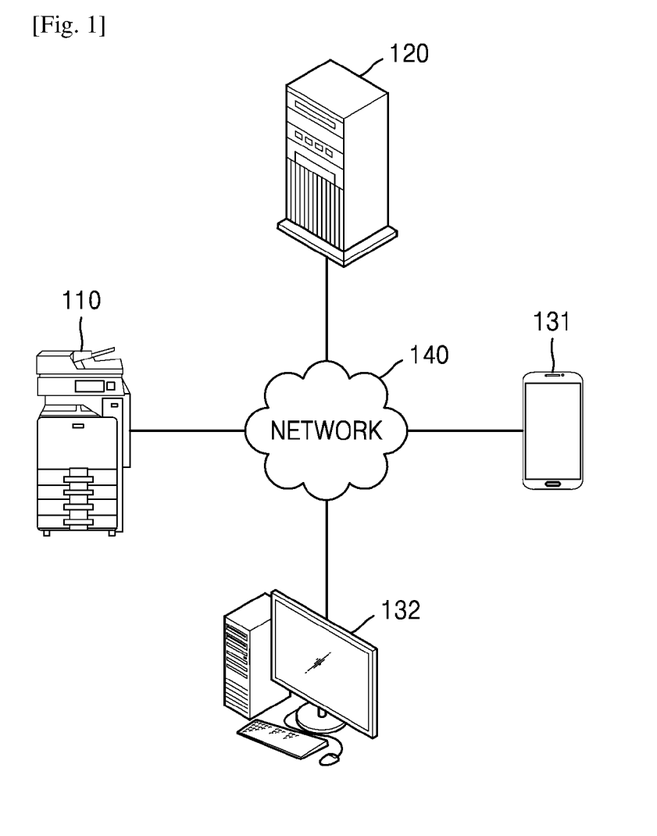
FIG. 1 is a diagram of a system for providing a service, according to an example.

FIG. 1 is a diagram of a system for providing a service, according to an example.

Referring to FIG. 1, a system for providing a service, according to an example, may include an image forming apparatus 110, a server 120, and user terminals 131 and 132. In an example, the image forming apparatus 110, the server 120, and the user terminals 131 and 132 may be connected to a network 140.

The image forming apparatus 110 refers to any apparatus, such as a printer, a scanner, a fax machine, a multi-function printer (MFP), or a display, that is capable of performing an image forming job. The image forming job may refer to image formation or various jobs (e.g., printing, scanning, or faxing) related to an image, for example, creation, storage, transmission, etc. of an image file, and the job may refer to not only the image forming job but also a series of processes required to perform the image forming job.

The server 120 provides a service to a user. For example, the server 120 may determine, with respect to a user having accessed the server 120, a user level within a hierarchy structure and a user group to which the corresponding user belongs, and thus, may provide a suitable service to the corresponding user. The server 120 may be configured as a local server, a remote server, a cloud server, etc.

The user terminals 131 and 132 allow a user to access the server 120 and be provided with services. The user terminals 131 and 132 may include, for example, a smartphone, a tablet, a personal computer (PC), a household appliance, a medical appliance, a camera, a wearable device, etc.

The network 140 connects the image forming apparatus 110, the server 120, and the user terminals 131 and 132 to one another. The server 120 may be connected to the user terminals 131 and 132 via the network 140 and provide a service to a user. The network 140 may include, for example, the Internet.

Figure 2:
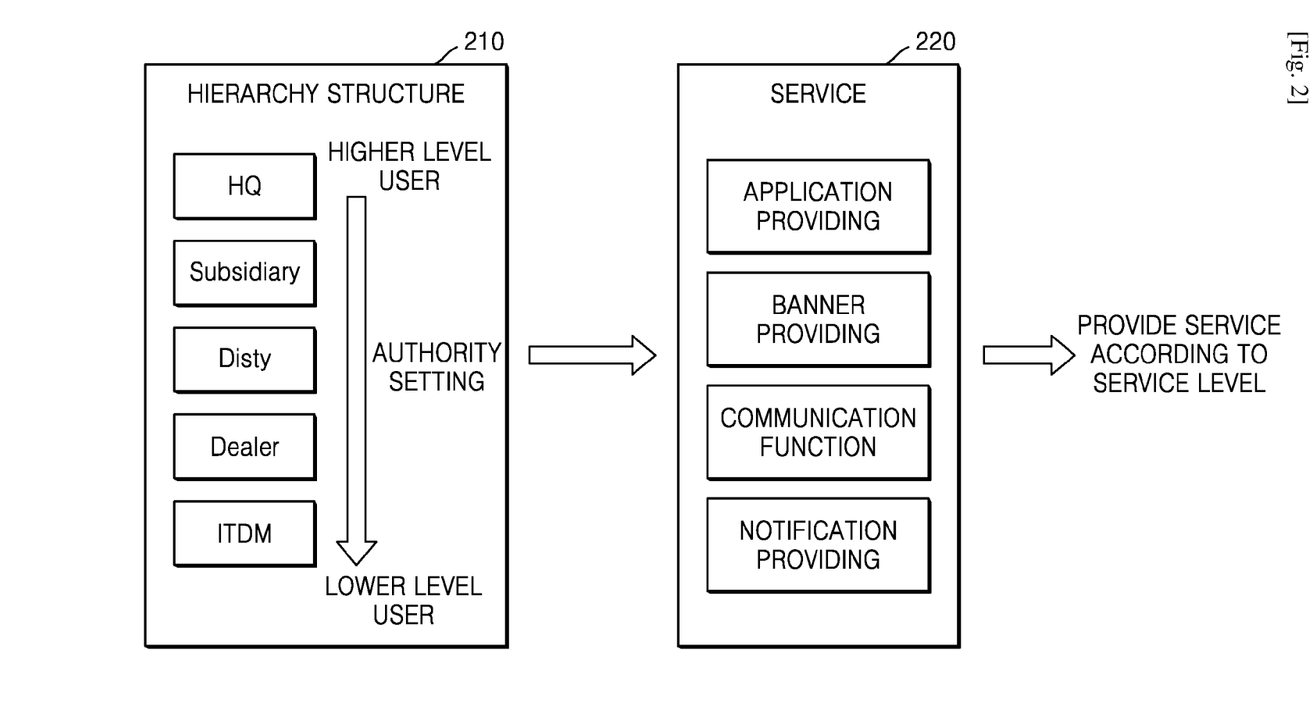
FIG. 2 is a diagram of a process of providing a service via a server in the system of FIG. 1, according to an example.

FIG. 2 is a diagram of a process of providing a service via a server in the system of FIG. 1, according to an example.

Referring to FIG. 2, within a hierarchy structure 210 formed between users, the server 120 determines a service level of a service that is to be provided to a user according to an authority that a higher level user has set with respect to a lower level user, and provides a service 220 according to the determined service level. The hierarchy structure 210 may be composed of business units in connection with manufacture, distribution, and use of the image forming apparatus 110. For example, the hierarchy structure 210 in which Head Quarter (HQ), Subsidiary, Disty, Dealer, and IT Device Manager (ITDM) are set as classes may be configured. Also, the service 220 may be a service related to the image forming apparatus 110, but the present disclosure is not limited thereto. For example, the server 120 may provide services such as an application providing service, a banner providing service, a communication function providing service, and a notification providing service.

Figure 3:
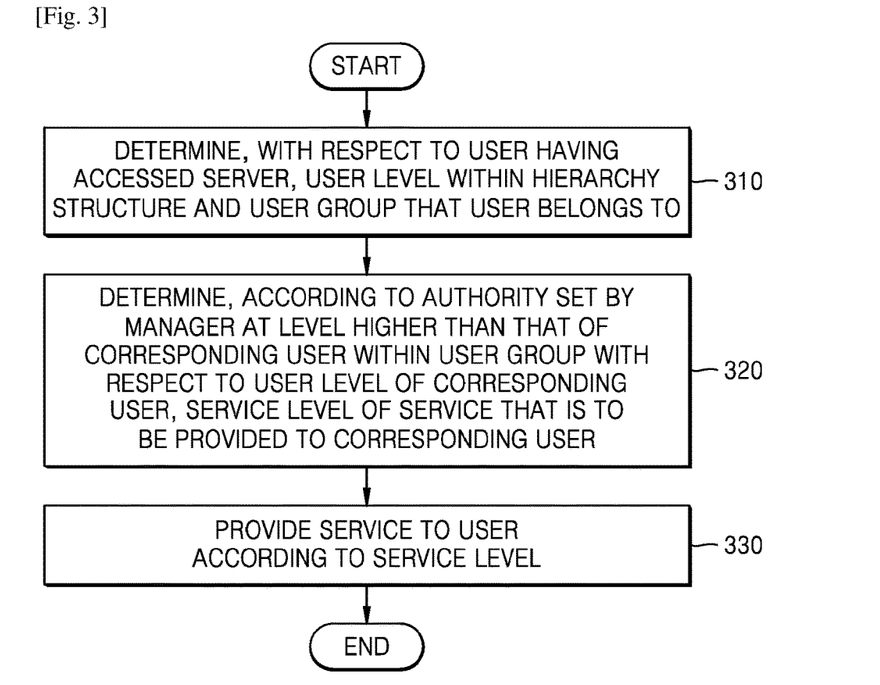
FIG. 3 is a flowchart of an operation method of a server, according to an example.

FIG. 3 is a flowchart of an operation method of a server, according to an example.

Referring to FIG. 3, in operation 310, a server determines, with respect to a user having accessed the server, a user level within a hierarchy structure and a user group to which the corresponding user belongs. In an example, the hierarchy structure may be composed of business units in connection with manufacture, distribution, and use of the image forming apparatus 110. For example, the hierarchy structure in which Head Quarter (HQ), Subsidiary, Disty, Dealer, and IT Device Manager (ITDM) are set as classes may be configured. In this case, each of the classes corresponds to the user level. Also, the user group may include higher level and lower level users directly and indirectly connected to the user having accessed the server. The server may determine which user level corresponds to the user having accessed the server, and may determine to which user group the user having accessed the server belongs by analyzing the higher level and lower level users directly and indirectly connected to the user having accessed the server. This will be described with reference to FIG. 4.

Figure 4:
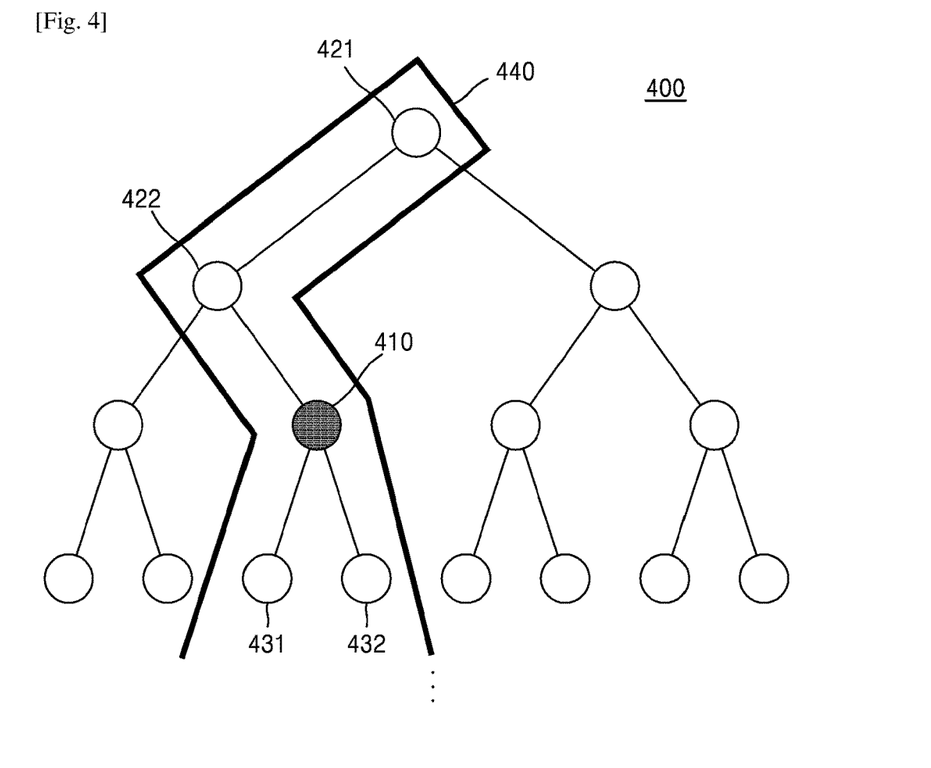
FIG. 4 is a diagram of a user group according to an example.

FIG. 4 is a diagram of a user group according to an example.

Referring to FIG. 4, a user 410 having accessed a server has a certain user level within a hierarchy structure 400. The hierarchy structure 400 may include a user having a higher user level than the user 410 having accessed the server, a user having the same user level as the user 410 having accessed the server, and a user having a lower user level than the user 410 having accessed the server. The server may determine a user group 440 to which the user 410 having accessed the server belongs by analyzing users 421 and 422 having a higher user level and users 431 and 432 having a lower user level from among the users having various user levels as described above, the users 421 and 422 and the users 431 and 432 directly and indirectly connected to the user 410 having accessed the server.

Further, when the server determines a user group of the user 410 having accessed the server, the server may determine the user group 440 according to a user input. For example, the user 410 having accessed the server may select certain users and set the corresponding users as the users 431 and 432 having a lower user level directly and indirectly connected to the user 410. Further, the user 410 having accessed the server may invite certain users and set the certain users as the users 431 and 432 having a lower user level connected to the user 410.

According to an example, the server may not determine a service that is to be provided to a user having accessed the server simply based on a user level but may provide an efficient service by also considering a user group that includes the user having accessed the server.

Referring back to FIG. 3, in operation 320, the server determines a service level of a service that is to be provided to the corresponding user according to an authority that a manager located at a level higher than that of the corresponding user within the user group sets with respect to a user level of the corresponding user.

The higher level manager may set an authority with respect to a lower user level within the user group, or a user or user group having a lower user level. As described above, the authority set by the higher level manager may be stored in the memory of the server and be used. In an example, when the user 410 accesses the server, the server may determine an authority that is set by a manager located at a level higher than that of the user 410 having accessed the server with respect to a user level of the user 410 having accessed the server, the user 410 having accessed the server, or a user group to which the user 410 having accessed the server belongs.

The server determines a service level of a service that is to be provided to the corresponding user 410 according to the authority set with respect to the user 410 having accessed the server from among services that may be provided to the user. The service level is a parameter that indicates how much of a service is to be provided to a user. For example, when a service that the server provides is an application providing service, the server may differently provide a type of an application that the user may download according to the authority set with respect to the user, according to a country, etc. Alternatively, in the case of a certain application, the server may provide the certain application only to a certain user or a certain user group.

When a service that the server provides is a banner providing service, the server may differently provide a banner that is shown to the user according to the authority set with respect to the user. When a service that the server provides is a communication function providing service, the server may permit participation in communication according to the authority set with respect to the user. When a service that the server provides is a notification providing service, the server may transmit a notification according to the authority set with respect to the user.

Further, in operation 330, the server may provide a service to the user 410 having accessed the server according to the service level. In an example, the service may include at least one of an application providing service, a banner providing service, a communication function providing service, and a notification providing service. Also, the server may provide the same service to users having the same service level. For example, the server may provide the same application, the same banner, or the same notification to users having the same service level. Alternatively, the server may provide a communication function that allows users having the same service level to communicate with each other. An example of a service providing method will be described below.

The server may transmit information regarding a service that may be provided to the user 410 having accessed the server according to the service level to a user terminal of the user 410. The server may receive a service providing request from the user 410 through the user terminal and may provide a requested service to the user 410.

In the case of a service that is used in various business groups where a close hierarchical relationship is formed according to characteristics of business, for example, in the case of a printer market, services that each business group requires may be different from each other. According to an example, instead of a uniform service, only the service that a corresponding user requires may be provided according to a user level and a user group.

According to a user's request, the server may set, within an authority set with respect to a user level of the user, an authority with respect to a user level that is lower than the corresponding user level within the user group. Also, the processor may set an authority with respect to a user or user group having a lower user level than the corresponding user level. Examples of this will be described with reference to FIGS. 5 to 7.

Figure 5:
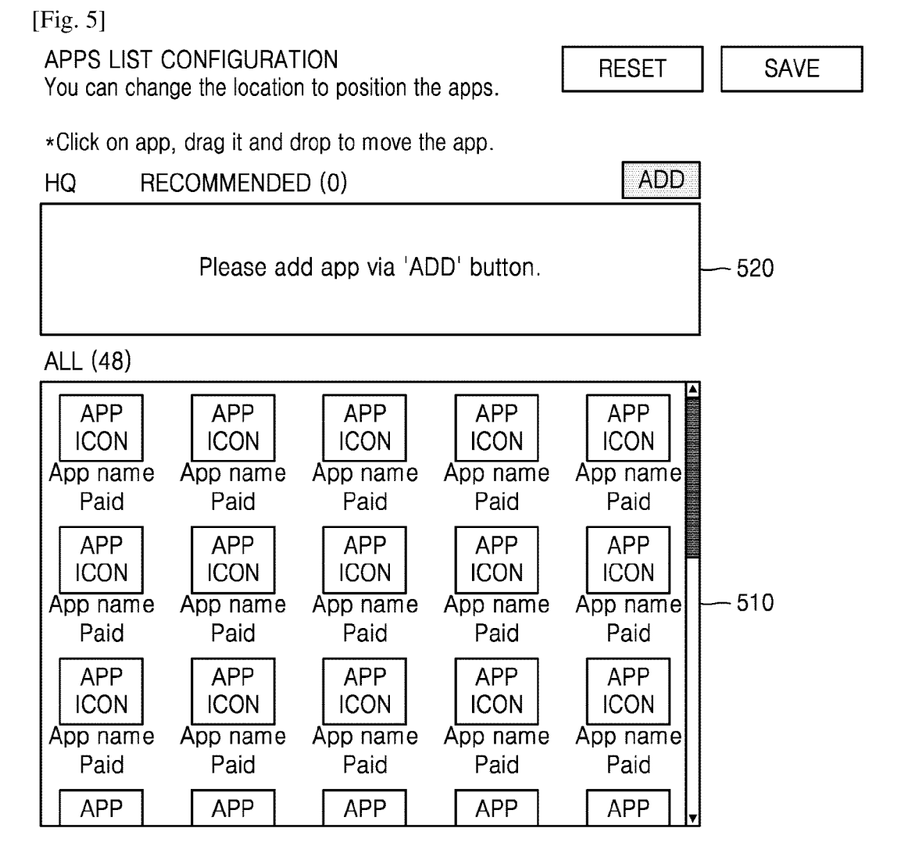
FIG. 5 is a diagram of a process in which a user having a Head Quarter (HQ) level selects an application that is to be recommended to users having a lower user level, according to an example.
Figure 6:
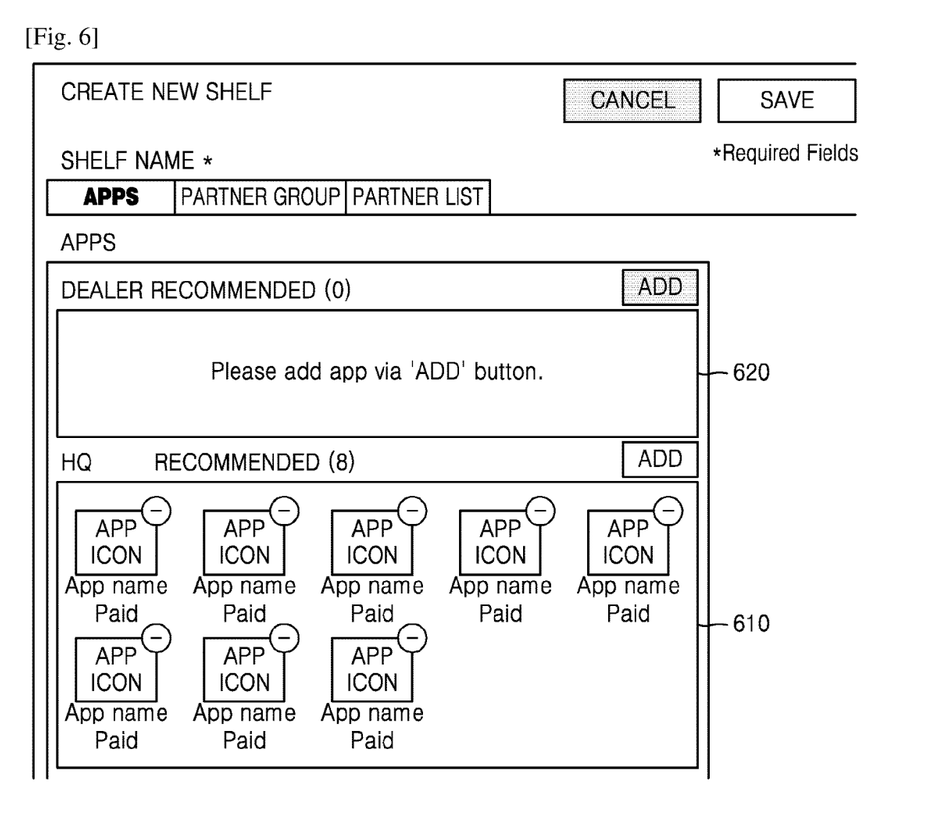
FIG. 6 is a diagram of a process in which a user having a Dealer level selects an application that is to be recommended to users having a lower user level, according to an example.
Figure 7:
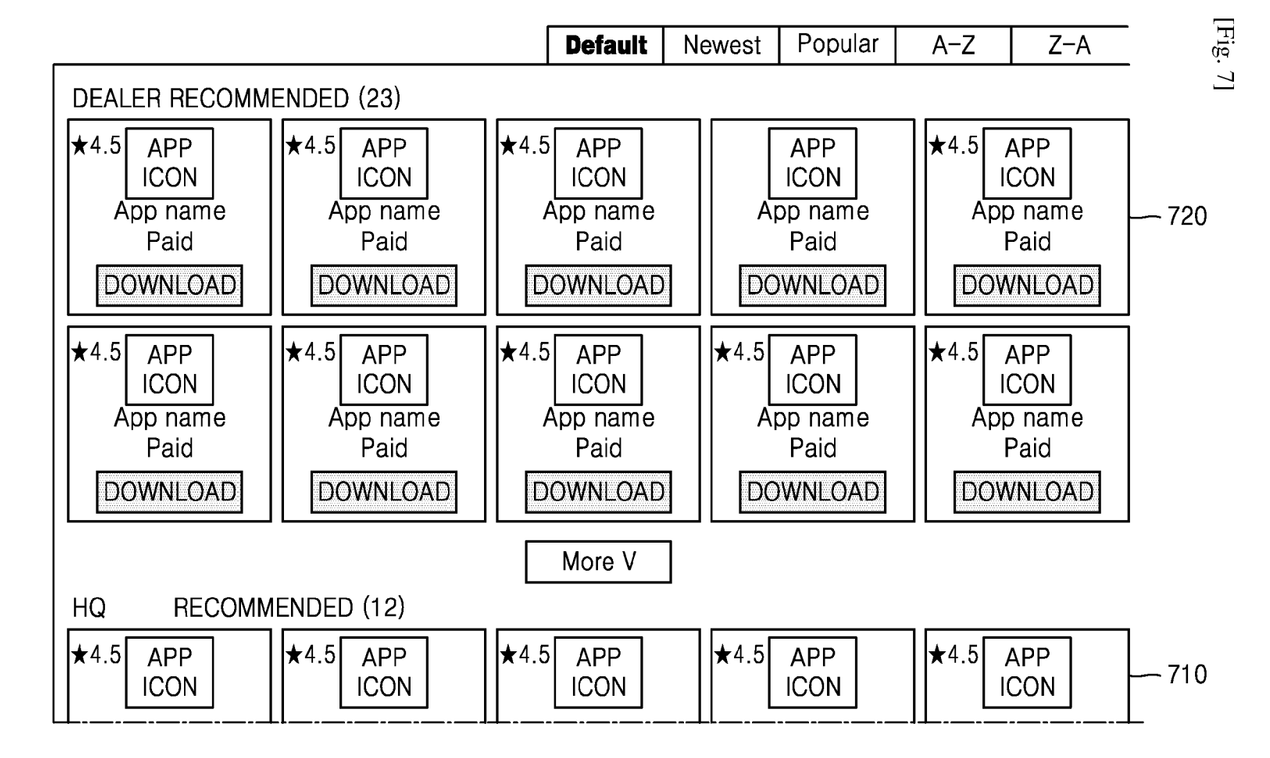
FIG. 7 is a diagram of a screen that displays a recommended application, according to an example.

FIGS. 5 to 7 show an application recommendation service, according to an example, in which a user selects an application that is to be recommended to lower level users according to a corresponding user level. FIGS. 5 to 7 will be described based on the assumption that a hierarchy structure in which HQ, Subsidiary, Disty, Dealer, and ITDM are set as classes is configured. However, the illustrated hierarchy structure is merely one example.

FIG. 5 is a diagram of a process in which a user having an HQ level selects an application that is to be recommended to users having a lower user level, according to an example.

Referring to FIG. 5, a user having an HQ level, which is the highest user level, may select an application that is to be recommended to users having a lower user level, from among all the applications that the server may provide. For example, when the server transmits information related to an application that the user having the HQ level may select to a user terminal, the user terminal displays all the applications that the server may provide by using the corresponding information. The user having the HQ level may select an application that is to be recommended to the users having a lower user level from among the applications shown on the user terminal. In this regard, the user having the HQ level may select an application by selecting at least one application icon displayed on an application list 510 shown on the user terminal and dragging the at least one application icon into a recommendation box 520. The server may provide a recommended application to lower level users according to the selection of the user having the HQ level. The recommended application may be shown to users that have a lower user level within the same user group. Since the HQ level is the highest user level, the application recommended by the user having the HQ level may be shown to every user.

FIG. 6 is a diagram of a process in which a user having a Dealer level selects an application that is to be recommended to users having a lower user level, according to an example.

Referring to FIG. 6, a user having a Dealer level, which is a lower user level than the HQ level, may select an application that is to be recommended to users having a lower user level than that of the user within an authority. The user having the Dealer level may select an application that is to be recommended to the users having a lower user level than the user within an authority that is assigned by higher users to the user, that is, applications that may be selected by the user. In this regard, the user having the Dealer level may select an application by selecting at least one of application icons shown on a user terminal and dragging the at least one into a Dealer recommendation box 620. Also, the user having the Dealer level may edit and reset an application list 610 recommended by a user having a higher user level, for example, the user having the HQ level. The server may provide a recommended application to lower level users according to selection or editing of the user having the Dealer level. Since the Dealer level has ITDM as a lower level, an application recommended by the user having the Dealer level may be shown to users having an ITDM level. The recommended application may be shown to users that have a lower user level within the same user group. That is, different recommended applications may be shown to the users having the ITDM level when the users belong to different user groups from each other.

FIG. 7 is a diagram of a screen that displays a recommended application, according to an example.

Referring to FIG. 7, a screen that is shown to a user displays an HQ recommendation list 710 and a Dealer recommendation list 720. As described above, the HQ recommendation list 710 and the Dealer recommendation list 720 have been set by higher level users within the same user group. Accordingly, only the service that a corresponding user requires may be shown according to a user group, and thus, an efficient service may be provided.

Further, although the application recommendation service has been described as an example with reference to FIGS. 5 to 7, application setting itself may be controlled. For example, a user having a higher user level may control an authority of a user having a lower user level by limiting a type of an application that the user having the lower user level may set.

Figure 8:
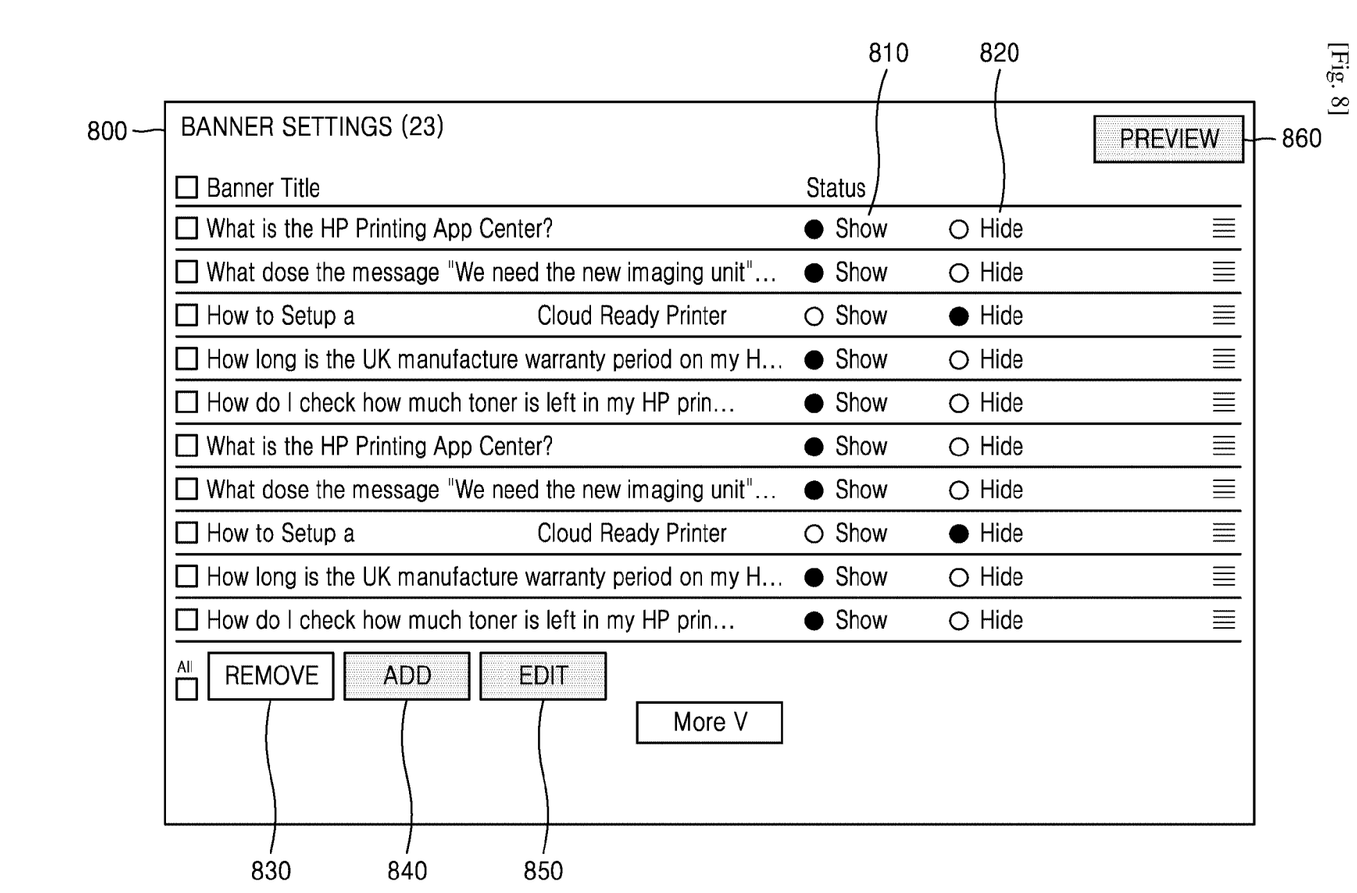
FIG. 8 is a diagram of a setting screen for a banner providing service, according to an example.

FIG. 8 is a diagram of a setting screen for a banner providing service, according to an example.

Referring to FIG. 8, a user may manage a banner that is shown to users having a lower user level than the user within an authority that the user has through banner setting. For example, a user having a Dealer level may edit and reset a banner list 800 set by a user having a higher user level, for example, a user having an HQ level. For example, the user having the Dealer level may show or hide a banner set by the user having the HQ level through a Show button 810 or a Hide button 820. Also, the banner set by the user having the HQ level may be removed or a banner may be added through a REMOVE button 830 or an ADD button 840. Further, the contents of the banner set by the user having the HQ level may be revised through an EDIT button 850, and the banner may be checked in advance through a PREVIEW button 860. The server may provide a banner to lower level users according to a setting of the user having the Dealer level. Since the Dealer level has ITDM as a lower level, a banner set by the user having the Dealer level may be shown to users having an ITDM level. A banner set by a user may be shown to users that have a lower user level within the same user group. That is, different banners may be shown to the users having the ITDM level when the users belong to different user groups from each other.

The notification providing service and the communication function providing service may also be provided in a similar way to the application providing service and the banner providing service described above. A user may manage a notification that is transmitted to users having a lower user level than the user within an authority that the user has. Also, the user may select users having a lower user level than the user and provide a communication function.

Figure 9:
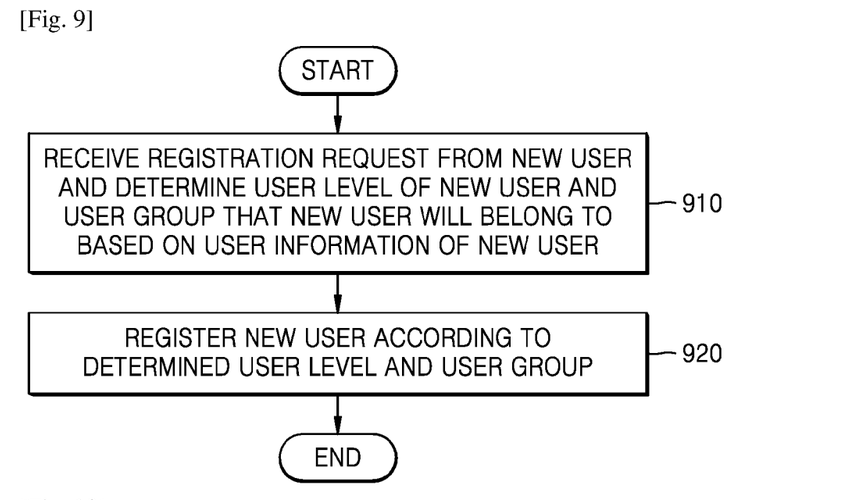
FIG. 9 is a flowchart of a method of registering a new user, according to an example.

FIG. 9 is a flowchart of a method of registering a new user, according to an example.

Referring to FIG. 9, a server may receive a registration request from a new user, and may determine a user level of the new user and a user group to which the new user will belong based on user information of the new user in operation 910. When the new user accesses the server, the server may receive information related to the user level and information related to a user having a higher user level directly or indirectly connected to the new user from the new user. For example, when a user having a Dealer level newly accesses the server, the server may receive information that the user corresponds to the Dealer level and information of a higher level user directly or indirectly connected to the user, for example, a user having an HQ, Subsidiary, or Disty level connected to the user, from the corresponding user. The server may determine a user level of the new user and a user group to which the new user will belong based on the received information.

In operation 920, the server may register the new user according to the determined user level and user group. Then, the server may provide a service to the new user according to the user level and the user group.

An operation method of a server, according to an example, has been described above.

An operation method of a server will be described below with reference to FIG. 10 according to an example. In this regard, a repeated description thereof will be briefly given.

Figure 10:
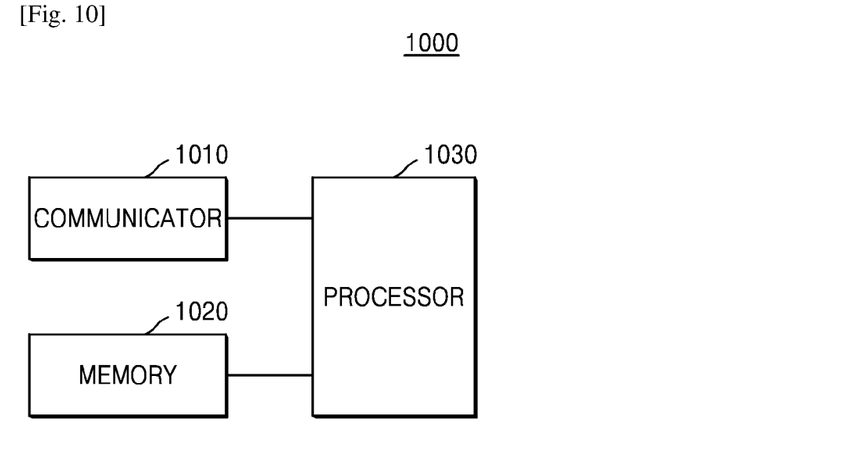
FIG. 10 is a block diagram of a structure of a server according to an example.

FIG. 10 is a block diagram of a structure of a server according to an example.

Referring to FIG. 10, a server 1000 may include a communicator 1010, a memory 1020, and a processor 1030.

The communicator 1010 may perform wired or wireless communication with another device or a network. To this end, the communicator 1010 may include a communication module for supporting at least one of various wired and wireless communication methods. For example, the communication module may have the form of a chipset.

The communicator 1010 may be connected to an external device located outside the server 1000 and may transmit and receive signals or data to and from the external device. The server 1000 may be connected to the external device via the communicator 1010 and transmit the signals or data received from the external device to the processor 1030, or may transmit the signals or data generated from the processor 1030 to the external device. In an example, the communicator 1010 may receive an access request from a user, and may transmit data related to a service according to a service level of the service that is to be provided to the user having accessed.

Various types of programs, such as applications, and various types of data, such as files, may be installed and stored in the memory 1020. The processor 1030 may access and use the data stored in the memory 1020, or may store new data in the memory 1020. Also, the processor 1030 may execute a program installed in the memory 1020. In an example, a program for providing a service through a server may be stored in the memory 1020.

The processor 1030 may control general operations of the server 1000. For example, the processor 1030 may control a process in which the server 1000 provides a service. Also, the processor 1030 may store a signal or data input from the outside of the server 1000, or may operate by using a random-access memory (RAM), which is used as a storage area corresponding to various operations executed by the server 1000, or a read-only memory (ROM), in which a control program for controlling a peripheral device is stored. The processor 1030 may be implemented as a system on chip (SoC) in which a core processor and a graphics processing unit (GPU) are integrated. Also, the processor 1030 may include a plurality of processors.

The processor 1030 determines, with respect to a user having accessed the server 1000, a user level within a hierarchy structure and a user group to which the user belongs, and determines a service level of a service that is to be provided to the corresponding user according to an authority set by a manager located at a level higher than that of the corresponding user within the user group with respect to the user level of the corresponding user. Also, the processor 1030 controls the server 1000 so as to provide a service to the user according to the service level. In an example, the service may include at least one of an application providing service, a banner providing service, a communication function providing service, and a notification providing service.

According to the user's request, the processor 1030 may set, within the authority set with respect to the user level of the user, an authority with respect to a user level lower than the corresponding user level within the user group. Also, the processor 1030 may set an authority with respect to a user or a user group having a lower user level than the corresponding user level. Further, the processor 1030 may control the server 1000 so as to transmit information regarding a service that may be provided to the user according to the service level to a user terminal of the user.

The processor 1030 may receive a registration request from a new user, may determine a user level of the new user and a user group to which the new user will belong based on user information of the new user, and may register the new user according to the determined user level and user group. In this regard, the processor 1030 may obtain a registration grant from a manager having a higher user level than the user level within the user group of the new user.

The above examples may be embodied as a computer-readable recording medium for storing a command which can be executed by a computer and data. At least one of the command and the data may be stored as a program code, and when it is executed by a processor, a predetermined program module may be generated to perform a predetermined operation.

The computer-readable recording medium may refer to a magnetic storage medium such as a hard disk, an optical reading medium such as compact disc read-only memory (CD-ROM) or digital versatile disc (DVD), etc. or may refer to a memory included in an external device accessible through a network.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope of the inventive concept as defined by the following claims.

The invention claimed is:

1. An operation method of a server, the operation method comprising:

receiving, from a first user, a request to access the server, the request including information of a user level of the first user within a hierarchy structure and information of a second user having a higher or lower user level than the first user and directly or indirectly connected to the first user within the hierarchy structure;

determining a user group to which the first user belongs;

determining, according to an authority that is set by a manager at a level higher than that of the first user within the user group with respect to the user level of the first user, a service level of a service that is to be provided to the first user; and providing the service to the first user according to the service level, wherein the user group to which the first user belongs is determined based on the information of the second user connected to the first user.

2. The operation method of claim 1, further comprising:

according to a request made by the first user, setting, within the authority set with respect to the user level of the first user, an authority with respect to a user level lower than the user level within the user group.

3. The operation method of claim 1, further comprising:

according to a request made by the first user, setting, within the authority set with respect to the user level of the first user, an authority with respect to a third user or user group having a lower user level than the user level within the user group.

4. The operation method of claim 1, wherein the providing of the service to the first user according to the service level comprises:
transmitting, to a user terminal of the first user, information regarding a service that is capable of being provided to the first user according to the service level.

5. The operation method of claim 1, further comprising:
receiving a registration request from the first user; and
registering the first user according to the user level of the first user and the determined user group.

6. The operation method of claim 5, wherein the registering of the first user according to the user level of the first user and the determined user group comprises:
obtaining a registration grant from a manager having a higher user level than the user level within the user group of the first user.

7. The operation method of claim 1, wherein the service comprises at least one of an application providing service, a banner providing service, a communication function providing service, or a notification providing service.

8. The operation method of claim 1, wherein the providing of the service to the first user according to the service level comprises:
providing the same service to other users having the same service level.

9. A server comprising:
a communicator to communicate with an external device;
a memory to store a program for providing a service through the server; and
a processor to:
control the server so as to, by executing the program for providing the service,
receive, from a first user, a request to access the server, the request including information of a user level of the first user within a hierarchy structure and information of a second user having a higher or lower user level than the first user and directly or indirectly connected to the first user within the hierarchy structure,
determine a user group to which the first user belongs,
determine, according to an authority that is set by a manager at a level higher than that of the user within the user group with respect to the user level of the first user, a service level of a service that is to be provided to the first user, and
provide the service to the first user according to the service level,
wherein the processor is to determine the user group to which the first user belongs based on the information of the second user connected to the first user who has accessed the server.

10. The server of claim 9, wherein the processor, according to a request made by the first user, sets, within the authority set with respect to the user level of the first user, an authority with respect to a user level lower than the user level within the user group.

11. The server of claim 9, wherein the processor, according to a request made by the first user, sets, within the authority set with respect to the user level of the first user, an authority with respect to third user or user group having a lower user level than the user level within the user group.

12. The server of claim 9, wherein the processor transmits, to a user terminal of the first user, information regarding a service that is capable of being provided to the first user according to the service level.

13. The server of claim 9, wherein the processor:
receives a registration request from the first user,
registers the first user according to the user level of the first user and the determined user group.

14. The server of claim 13, wherein the processor obtains a registration grant from a manager having a higher user level than the user level within the user group of the first user.

15. The server of claim 9, wherein the service comprises at least one of an application providing service, a banner providing service, a communication function providing service, or a notification providing service.

* * * * *